Sept. 1, 1953     C. O. LARSON     2,650,717
DISPLAY STAND
Filed Oct. 5, 1948     2 Sheets-Sheet 1
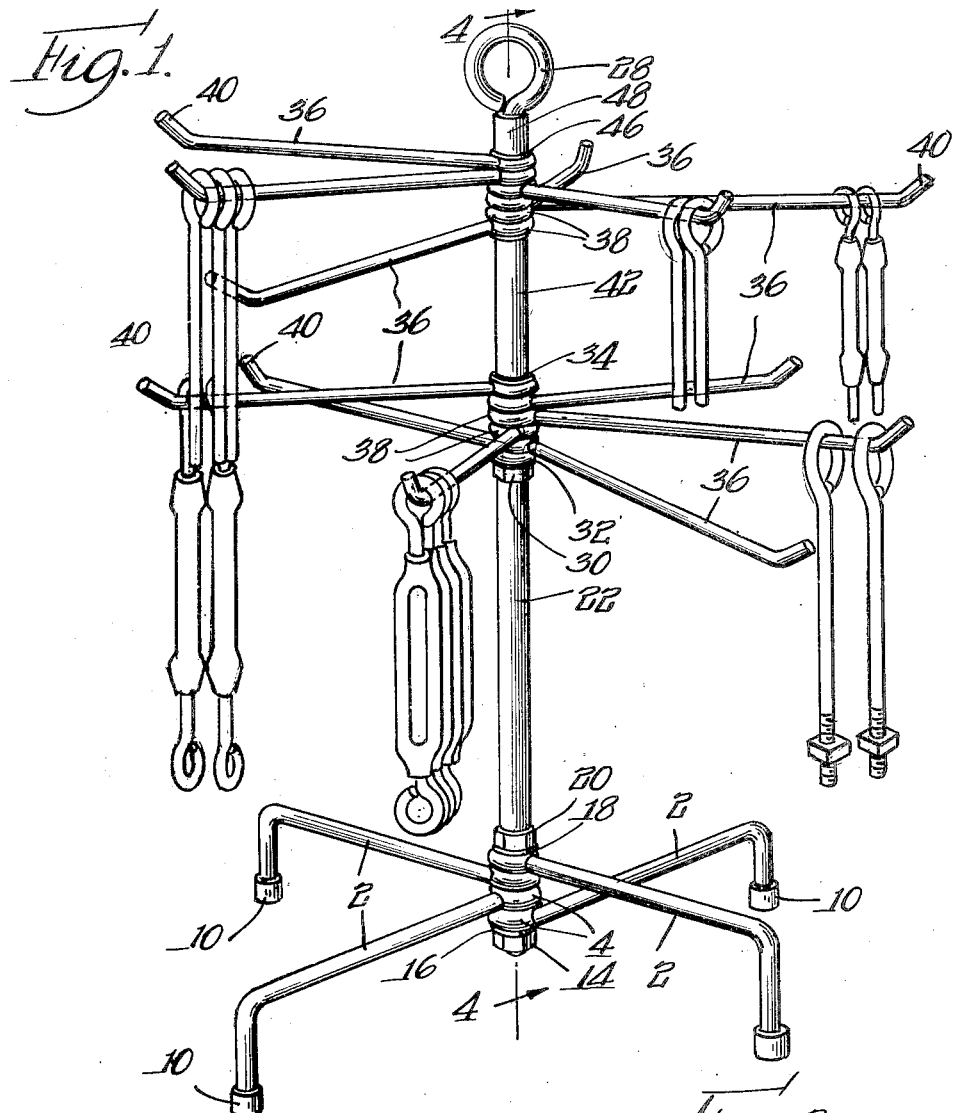
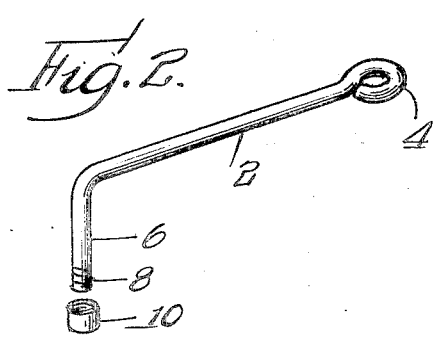
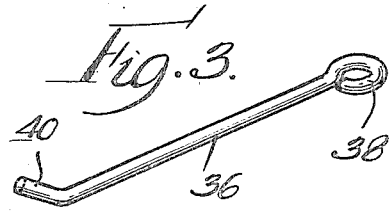
INVENTOR.
Charles O. Larson
BY
Moore, Olson & Trexler
attys.

Sept. 1, 1953  C. O. LARSON  2,650,717
DISPLAY STAND
Filed Oct. 5, 1948  2 Sheets-Sheet 2
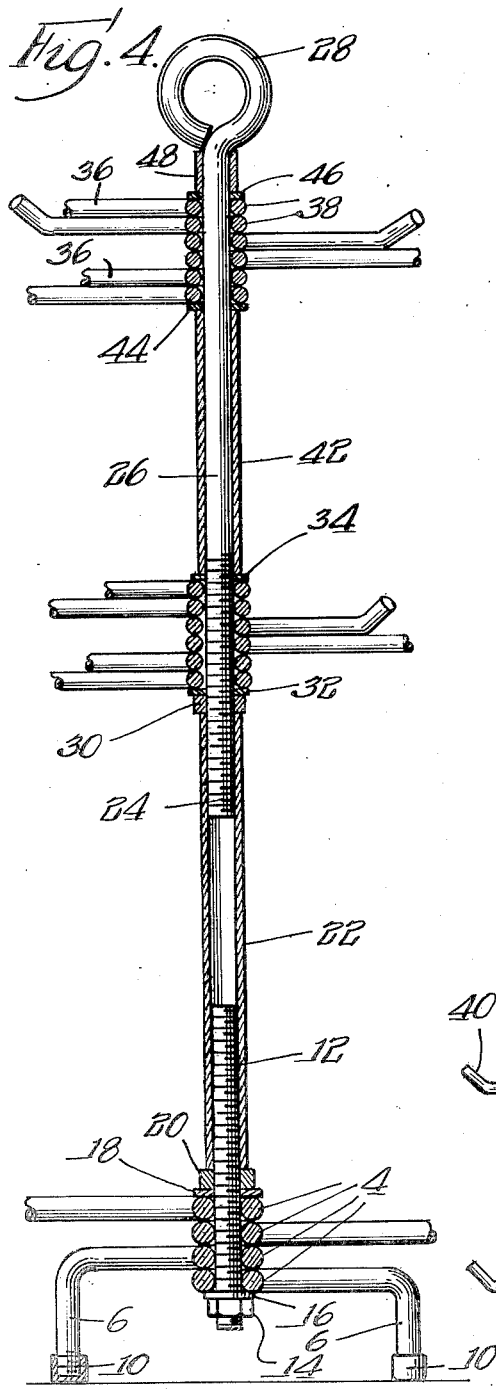
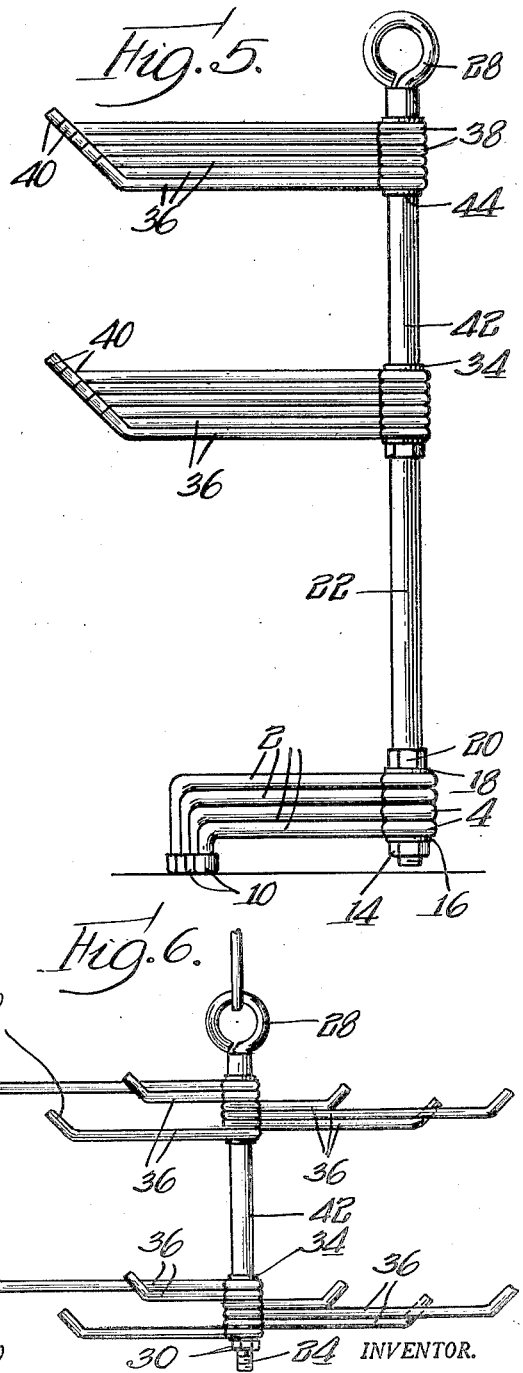
INVENTOR.
Charles O. Larson
By:- Moore, Olson & Trexler
Attys Patented Sept. 1, 1953

2,650,717

UNITED STATES PATENT OFFICE 2,650,717

DISPLAY STAND

Charles O. Larson, Sterling, Ill.

Application October 5, 1948, Serial No. 52,806

2 Claims. (Cl. 211—178)

This invention relates to display stands.

Among the objects of the present invention is to provide a display stand which is adapted to support in depending relation therefrom a series of articles carrying openings or eyes adapted to slip over a series of arms carried by the stand so that the articles may be hung therefrom in display or supported relation and wherein the stand is made so that it may be supported either from its base or may be hung from an overhead support.

Yet another object of the invention resides in providing a display stand of the foregoing characteristics which may be collapsed or folded into a single plane for storage or transportation purposes.

Another object of the invention resides in providing a display stand formed of a plurality of supporting arms of similar construction which are adapted to be assembled to an elongated eye bolt having one end provided with an eye and the opposite end provided with a screw shank, and an elongated threaded bolt with spacing washers, nuts and a pair of elongated unthreaded tubes, whereby a display device of simple construction, easy assembly, and low cost, having the characteristics hereinbefore set forth, may be provided.

These and other objects of the invention will be apparent from a perusal of the following specification when taken in connection with the accompanying drawings, wherein:

Figure 1 is a perspective view of one embodiment of the display stand;

Figure 2 is a perspective view of the leg member which supports the stand from the floor;

Figure 3 is a perspective view of one of the supporting arms;

Figure 4 is a sectional view taken on the line 4—4 of Figure 1;

Figure 5 is a view of the stand showing the arms and legs in folded condition; and Figure 6 is a view of the stand removed from its base so as to be hung from an overhanging overhead support.

Referring now to the drawings in detail, the display or support rack comprises a series of feet, there being four in number, and the feet being shown in detail in perspective in Figure 2 as comprising a metal or other rod having a preferably horizontal portion 2 terminating at an eye 4, the opposite end of the leg portion 2 having a relatively shorter portion 6 bent at right angles to the portion 2 and preferably threaded as at 8 to receive a rubber foot, thimble or sleeve 10 which may be screwed on or pressed on or fastened or adhered thereto in any desired manner. These legs are all of the same construction and size and shape, and they are adapted to slip over the lower end of a relatively long threaded rod 12, the lower end of which has threaded thereto a nut 14. Vertical leg portions of the legs 2 are of different heights as shown in Figs. 4 and 5. A washer such as 16 lies on the upper portion of the nut 14 and forms an enlarged surface to hold the eye portions 4 of the feet 2 in position thereon. An additional washer 18 overlies the topmost eyelet 4 and an additional nut 20 threads upon the rod 12 whereby securely to hold these leg members 2 in position such as shown in Figure 4. In this construction these leg portions 2 are free to swing into overlapping relation, as shown in Figure 5, thereby compacting them for storage or transportation purposes. By means of the foregoing construction it will be seen that these leg members rotate freely on the screw but may be held in open spaced apart position as shown in Figure 1 by a clamping effect of the two nuts 14 and 20 on the screw rod or shaft 12. Rotation of the arms may be effected by loosening one of the nuts or by having the nut sufficiently loose to permit free rotation at any desired time while holding the legs in spaced apart predetermined position.

An elongated tube or sleeve 22 has its lower end telescoping upon the free upstanding end of the threaded rod 12 and its upper end receives the lower threaded end 24 of a long eye bolt 26 the upper end of which is provided with a preferably relatively large eye 28. A third nut 30 threads onto the threaded portion 24 of this bolt and receives a washer 32. Between this washer 32 and an additional washer 34 are located a series of article-supporting arms 36 each having an eye 38 at one end and a laterally bent, relatively short portion 40 at the opposite end thereof. The end 40 is bent upwardly and laterally out of the plane of the eye portion 38 so that when a series of these arms, such as 36, are placed in vertically overlying relation with the eyes passing over the bolt shank 26, they will lie as shown in Figure 1 in spaced apart, angular relation about the central shaft portion 26, and with their outer ends 40 extending upwardly from the horizontal planes of the arms, thereby providing means for the retention of various articles hung from these arms lying upon the washer 34 and a third tubular sleeve 42 which surrounds the main portion of the eye bolt 26. This is a spacing sleeve, and above this sleeve is an additional washer 44 which receives upon it an additional set of the identical supporting arms 36, the eyes 38 of which surround the upper portion of the eye bolt 26. Surrounding and overlying these arms is the washer 46 and above this washer 46 is a metal spacing collar 48. The upper portion of the collar abuts the base of the eye portion 28 of the eye bolt 26. The assembly on the eye bolt 26 is held in position, as shown in Figures 1 and 4, by means of the nut 30 threading upon the threaded portion 24 of this eye bolt 26. It is to be understood that the eye bolt 26 lies freely and vertically in the sleeve 22 and may be lifted freely therefrom, as shown in Figure 6, to provide a hanging or depending stand. It will be noted from Figure 5 that the arms 36 and legs 2 are all capable of being pivoted about the eye bolt 26 or rod 12 so as to lie in a substantially contiguous position at least approaching a vertical arrangement with minimum transverse extent to afford a generally flat assembly for packing or transportation purposes. When moved into spaced position as shown in Figure 1 these arms will remain thereat or may be shifted therefrom or may be locked in position by tightening the nut 30 on its thread portion 24 of the eye bolt.

In the illustration shown in Figure 1 the supporting arms 36 are used for supporting various types of articles which have holes, eyes or perforations so that they may be threaded onto the supporting arms 36, the upward portions 40 of these arms 36 serving to prevent these members from slipping off while permitting free removal therefrom.

It is apparent that many widely different embodiments of this invention may be made without departing from the spirit and scope thereof, and therefore it is not intended to be limited except as indicated in the appended claims.

Having thus described the invention, what is claimed as new and desired to be secured by Letters Patent is:

1. A display or supporting rack comprising a plurality of base members each having an angularly disposed foot at one end and an eye at the other end, a threaded rod having at one end a nut threading thereon, said nut including a portion larger than the eyes of said base members, the eyes of said base members lying in adjacent superimposed position upon said threaded rod and above said nut, said base members being adapted for pivoting into a position in which the said base members are substantially contiguous and with the feet in contact, means on said rod above said eyes to hold the same assembled thereto, said threaded rod having a portion projecting beyond said means, an elongated tube having its lower end telescoping upon said rod and upstanding therefrom, an elongated eye bolt having its lower end threaded and its upper end provided with an eye, the lower end of said eye bolt projecting into said tube, a nut engaging an intermediate portion of the threaded end of said eye bolt and likewise engaging the upper end of said elongated tube, and a series of arms having eyes at one of their free ends for receiving said eye bolt and having up-turned portions at the opposite ends thereof, said arms being adapted for pivoting into a position in which the said arms lie in contiguous and substantially superposed relation in the same general direction as said base members, and means tightenable by relative rotation between said eye bolt and the nut thereon for holding said arms in assembled relation on said eye bolt.

2. A rack comprising an elongated eye bolt having its lower portion threaded and its upper portion provided with an eye, an elongated bolt having its lower portion threaded, said eye bolt and said elongated bolt having their central axes in registration, a pair of nuts threaded onto said elongated bolt in spaced relation at the bottom thereof, a series of basal supports having eye portions receiving said elongated bolt between said nuts and clampingly held therebetween, said supports having angularly disposed depending feet of variant lengths, said supports also having generally radially extending sections of variant lengths connecting the eye portions and the feet, the shorter section being positioned lowermost and the longer section being positioned uppermost when said supports are pivoted to lie in substantially contiguous relation, said supports being pivotal angularly and centrally about said elongated bolt into various spaced angular positions for supporting the rack or being shiftable into substantially contiguous relation with said members at least approaching overlying positions, a tube having its lower end freely telescoping upon the upper end of said elongated bolt, a nut engaging the upper end of said tube and threaded upon the lower threaded end of said eye bolt, and a series of supporting arms each having an eye at one end receiving said eye bolt, the said eyes of the supporting arms being pivotally mounted and held in clamping juxtaposition between the eye bolt and said last-mentioned nut, each said supporting arm terminating in an up-turned portion and being angularly shiftable about the eye bolt as an axis into substantially contiguous relation in the same general direction as said basal supports whereby the supporting arms including the up-turned portions thereof and the basal supports assume a position for generally flat packaging of the rack.

CHARLES O. LARSON.

References Cited in the file of this patent

UNITED STATES PATENTS

| Number | Name | Date |
|---|---|---|
| 31,868 | Buss | Apr. 2, 1861 |
| 89,131 | Draggett | Apr. 20, 1869 |
| 354,697 | Gabay | Dec. 21, 1886 |
| 505,797 | Wastall | Sept. 26, 1893 |
| 561,243 | Temple | June 2, 1896 |
| 639,958 | Bartel | Dec. 26, 1899 |
| 1,401,057 | Elliott | Dec. 20, 1921 |
| 1,691,123 | Pajeau | Nov. 13, 1928 |
| 1,804,931 | Hoban | May 12, 1931 |
| 1,940,091 | Kapp | Dec. 19, 1933 |
| 1,943,745 | Sanford | Jan. 16, 1934 |
| 1,948,014 | Tuttle | Feb. 20, 1934 |

FOREIGN PATENTS

| Number | Country | Date |
|---|---|---|
| 273,434 | Great Britain | July 7, 1927 |